United States Patent [19]
Takita

[11] Patent Number: 5,479,634
[45] Date of Patent: Dec. 26, 1995

[54] MULTIPROCESSOR CACHE MEMORY UNIT SELECTIVELY ENABLING BUS SNOOPING DURING IN-CIRCUIT EMULATION

[75] Inventor: Kazuhiko Takita, Tokyo, Japan

[73] Assignee: NEC Corporation, Japan

[21] Appl. No.: 19,227

[22] Filed: Feb. 18, 1993

[30] Foreign Application Priority Data

Feb. 19, 1992 [JP] Japan .................................. 4-031189

[51] Int. Cl.$^6$ ........................... G06F 12/08; G06F 12/16
[52] U.S. Cl. .................... 395/468; 364/DIG. 1; 395/472
[58] Field of Search ........................... 395/425; 365/49

[56] References Cited

U.S. PATENT DOCUMENTS

| | | | |
|---|---|---|---|
| 3,845,474 | 10/1974 | Lange et al. ........................ | 395/425 |
| 4,930,106 | 5/1990 | Danilenko et al. .................. | 395/425 |
| 5,014,240 | 5/1991 | Suzuki ................................. | 365/49 |
| 5,045,996 | 9/1991 | Barth et al. ......................... | 395/425 |
| 5,056,002 | 10/1991 | Watanabe ............................ | 395/425 |
| 5,119,485 | 6/1992 | Ledbetter, Jr. et al. .............. | 395/425 |
| 5,155,824 | 10/1992 | Edenfield et al. ................... | 395/425 |
| 5,157,774 | 10/1992 | Culley ................................. | 395/425 |
| 5,206,945 | 4/1993 | Nishimukai et al. ................ | 395/425 |
| 5,287,481 | 2/1994 | Lin ...................................... | 395/425 |

*Primary Examiner*—Michael A. Whitfield
*Attorney, Agent, or Firm*—Whitham, Curtis, Whitham & McGinn

[57] ABSTRACT

A cache memory unit for use in a multiprocessor. The unit includes a data memory, a tag memory, a valid flag section, and an address bus, a comparator, and a clear signal producing section which produces a monitoring clear signal based on an output from the comparator and a monitoring strobe signal. The valid flag section receives the monitoring clear signal from the clear signal producing section. The cache memory unit further includes a monitoring strobe signal activating section which causes the monitoring strobe signal to be inputted to the clear signal producing section active or inactive whereby the valid flag section is cleared or prohibited from being cleared. The monitoring strobe signal activating section is reset when the operation enters into an in-circuit emulator (ICE) program and is set when the operation is freed from the ICE program. The cache memory unit enables the system to be debugged precisely without no delay in the execution of time.

4 Claims, 4 Drawing Sheets

MULTIPROCESSOR CACHE MEMORY UNIT SELECTIVELY ENABLING BUS SNOOPING DURING IN-CIRCUIT EMULATION

BACKGROUND OF THE INVENTION

1. Field of the Invention

The present invention relates to a cache memory unit, and more particularly to a cache memory unit for use in a multiprocessor.

2. Description of the Related Art

Generally, in a system employing a multiprocessor configuration, where the data in a main memory is rewritten by another processor, the contents in the main memory may not be the same as those in a cache memory. In order to avoid this, if the address is monitored on writes to the main memory (hereinafter referred to as "monitoring") and the data indicated by the address is registered in the cache memory, the data thus registered is required to be disposed of by a process such as invalidation so as to maintain the identity or consistency in the contents of stored data between the main memory and the cache memory.

A conventional cache memory unit for use in a system adopting a multiprocessor configuration is shown in FIG. 1. The data read from the main memory is copied to and held in a data memory 105. One line in FIG. 1 is one entry which is generally constituted by several bytes. The address information of the data held in the data memory 105 is stored in a tag memory 104 and whether the contents in the data memory 105 are valid or invalid is indicated by a valid flag 106.

For monitoring the data, the lower bits in the address data on the address bus 101 are decoded by a decoder 102 and one entry in the cache memory is selected by a monitoring select signal 103 outputted from the decoder 102. The address stored in the tag memory 104 in the selected entry and the upper bits of the address data on the address bus 101 are compared by a comparator 107 and, if they are in agreement, a hit signal 108 of an active level is outputted from the comparator 107. At this time, if a monitoring strobe signal 112 supplied from a strobe signal input terminal 113 is active, a monitoring clear signal 110 of an active level is outputted from an AND gate 111, so that the valid flag 106 is cleared. Normally, the strobe signal input terminal 113 receives a write signal from another processor and is informed that the data-rewriting has been made in the main memory.

An example of the arrangement in a conventional multiprocessor system is shown in FIG. 2. A first central processing unit (CPU) 202, a second CPU 204, a third CPU 205 and a main memory 203 are connected to a common address bus 101 and a common data bus 201. The conventional cache memory unit built in the microprocessor CPU 202 receives as the monitoring strobe signal 112 a write signal from other CPUs 204 and 205. If other CPUs rewrite in the main memory 203 and, by monitoring, if the rewritten data is recognized as having been registered in the cache memory, the valid flag of the entry in which such data is stored is cleared and the contents of such entry are invalidated, so that the consistency between the main memory and the cache memory is maintained.

Where a system is organized by using a microprocessor having a cache memory for a multiprocessor and an in-circuit emulator (hereinafter referred to as an "ICE") is used for debugging such a system, there are possibilities wherein the contents in the cache memory are invalidated by monitoring when the data entry is made also to an ICE dedicated memory by the interruption of the ICE. Naturally, the rate of cache hits in the course of execution of the user's program is lowered, so that the execution speed of the system becomes slower.

Now, it is assumed that the volume of the cache memory is 1 K-bytes (KB), the width of the data bus is 32 bits, one bus cycle for cache replacing is 2 clocks and the CPI (clocks per instruction) is 1. If the ICE interruption occurs after the cache memory of 1 KB has become full by the user's program and the writing is made to the ICE dedicated memory in such a way that all of the cache memory of 1 KB is invalidated, it takes at least 512 clocks for the cache memory of 1 KB to become full after the operation returns to the user's program. This means that there is about 50% reduction in the performance of the user's program.

There is also a problem in that, due to the occurrence of a lag in timing with respect to other normal system operations, it may become impossible to perform accurate debugging of the system.

Also, in order to control a monitoring strobe signal by recognizing the data entry into the ICE dedicated memory, it is necessary to provide a control circuit dedicated to the ICE in the system itself.

SUMMARY OF THE INVENTION

It is, therefore, an object of the present invention to overcome the problems existing in the conventional cache memory unit described above and to provide an improved cache memory unit in which it is possible to invalidate unnecessary monitoring and to perform debugging of a system without lowering the execution speed of the user's program.

According to one aspect of the invention, there is provided a cache memory unit for use in a multiprocessor, the cache memory unit comprising:

a data memory which stores a data copied from a main memory;

a tag memory which stores address information of the data stored at the data memory;

a valid flag means which indicates whether contents of the data memory are valid and which is cleared by a monitoring clear signal;

an address bus which is connected to the main memory and which transfers the address information;

a comparing means which compares contents of the address bus and contents of the tag memory;

a clear signal producing means which produces the monitoring clear signal based on an output from the comparing means and a monitoring strobe signal informing whether contents of the main memory are rewritten; and a monitoring strobe signal activating means which activates or inactivates the monitoring strobe signal in accordance with monitoring enable flag.

BRIEF DESCRIPTION OF THE DRAWINGS

The above and other objects, features and advantages of the present invention will be apparent from the following description of a preferred embodiment of the invention explained with reference to the accompanying drawings, in which.

DESCRIPTION OF THE PREFERRED EMBODIMENT

Now, an embodiment according to the present invention is explained with reference to the accompanying drawings. It is to be noted that, throughout the following explanation, similar reference symbols or numerals refer to the same or similar elements in all the figures of the drawings.

Figure 3:
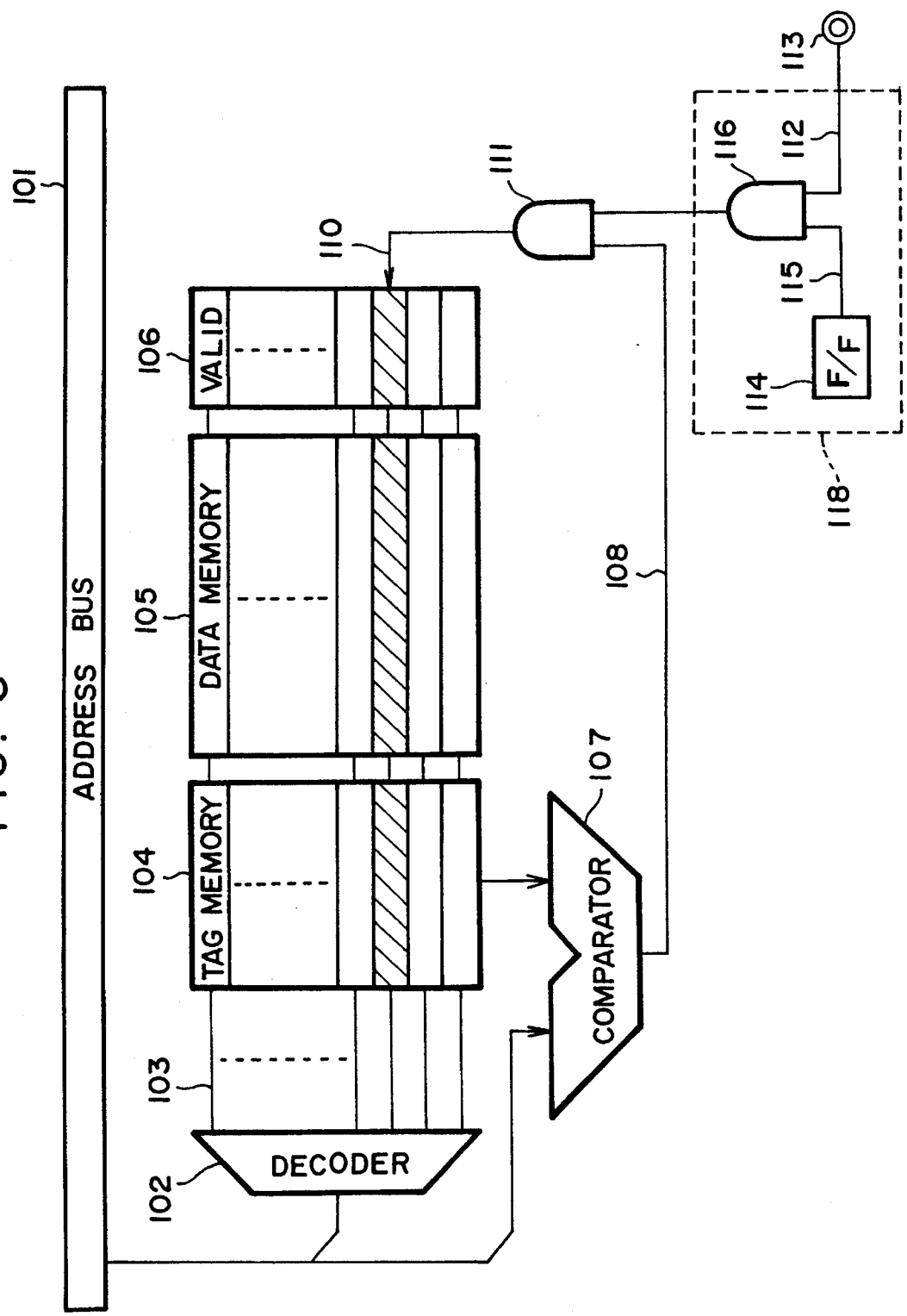
FIG. 3 is a structural block diagram illustrating an embodiment according to the present invention.

FIG. 3 shows a cache memory unit of the embodiment according to the invention. As in the conventional cache memory unit explained above, the data read from the main memory 203 is copied to and held in a data memory 105. The address information of the data held in the data memory 105 is stored in a tag memory 104 and a valid flag 106 indicates whether or not the contents of the data memory are valid.

For performing the monitoring, the lower bits of the data on the address bus 101 are decoded by a decoder 102 and one entry in the cache memory is selected by a monitoring select signal 103. The address information stored in the tag memory 104 of the selected entry is compared with the address data of the upper bits on the address bus 101 by a comparator 107 and, if they coincide, a hit signal 108 of an active level is outputted from the comparator 107.

Under the above state, if a monitoring strobe signal 112 applied to a strobe signal input terminal 113 is active and a monitoring enable flag means 114 has been set, an AND gate 116 receives the monitoring strobe signal 112 and the monitoring enable flag 115 both of which are active, so that an output of the AND gate 116 becomes active. Consequently, the monitoring clear signal 110 of active is outputted from an AND gate 111 and the valid flag 106 is cleared accordingly. In the case where the monitoring enable flag means 114 has been in a reset state, the monitoring clear signal 110 does not become active even if the monitoring strobe signal 112 is active. It should be noted that the monitoring enable flag means 114 is set or reset by the program. In this way, a monitoring strobe signal activating circuit 118 formed by the monitoring enable flag means 114 and the AND gate 116 operates to determine the validity or invalidity of the monitoring strobe signal 112.

Figure 1:
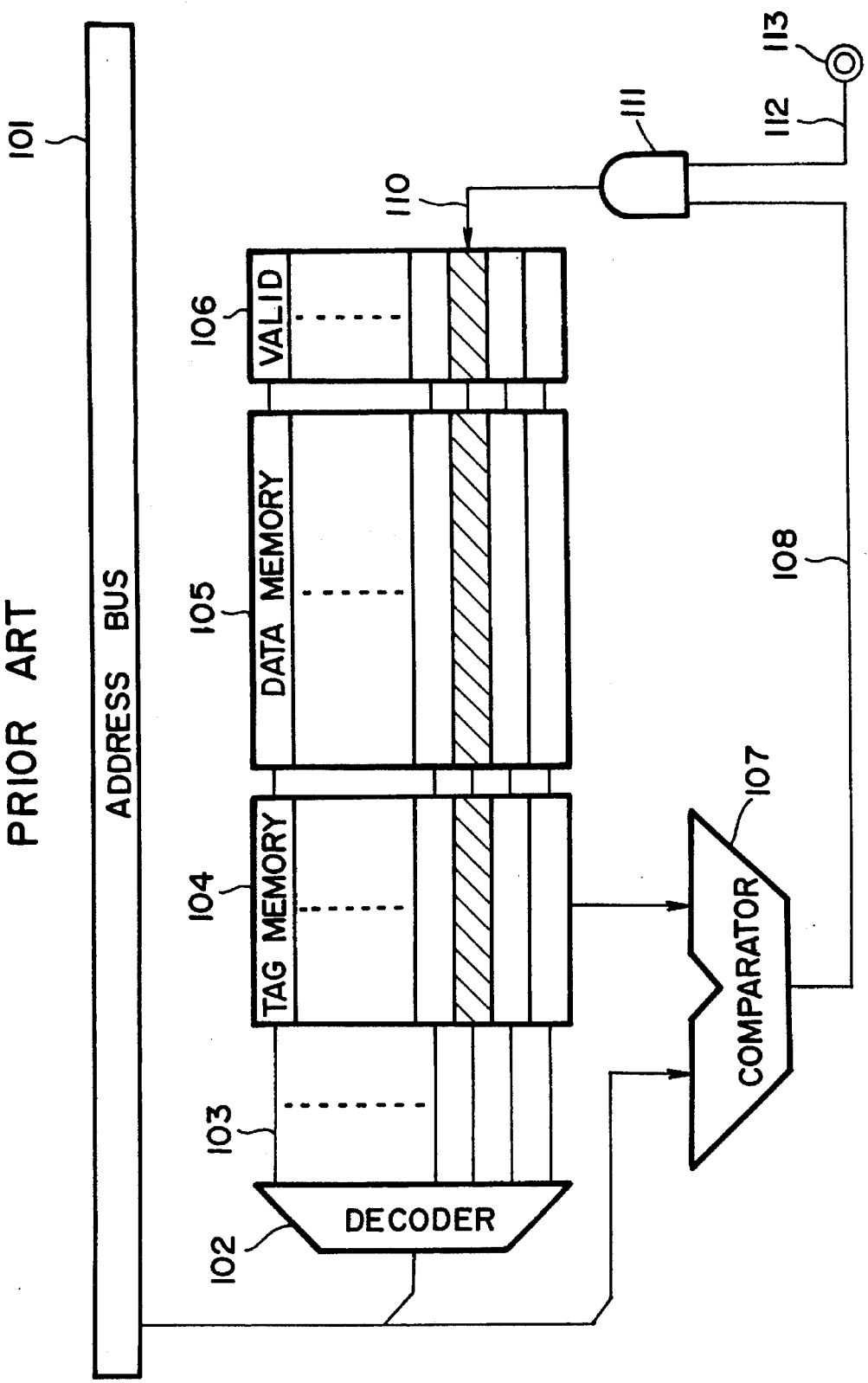
FIG. 1 is a structural block diagram illustrating a conventional cache memory unit for a multiprocessor configuration.
Figure 2:
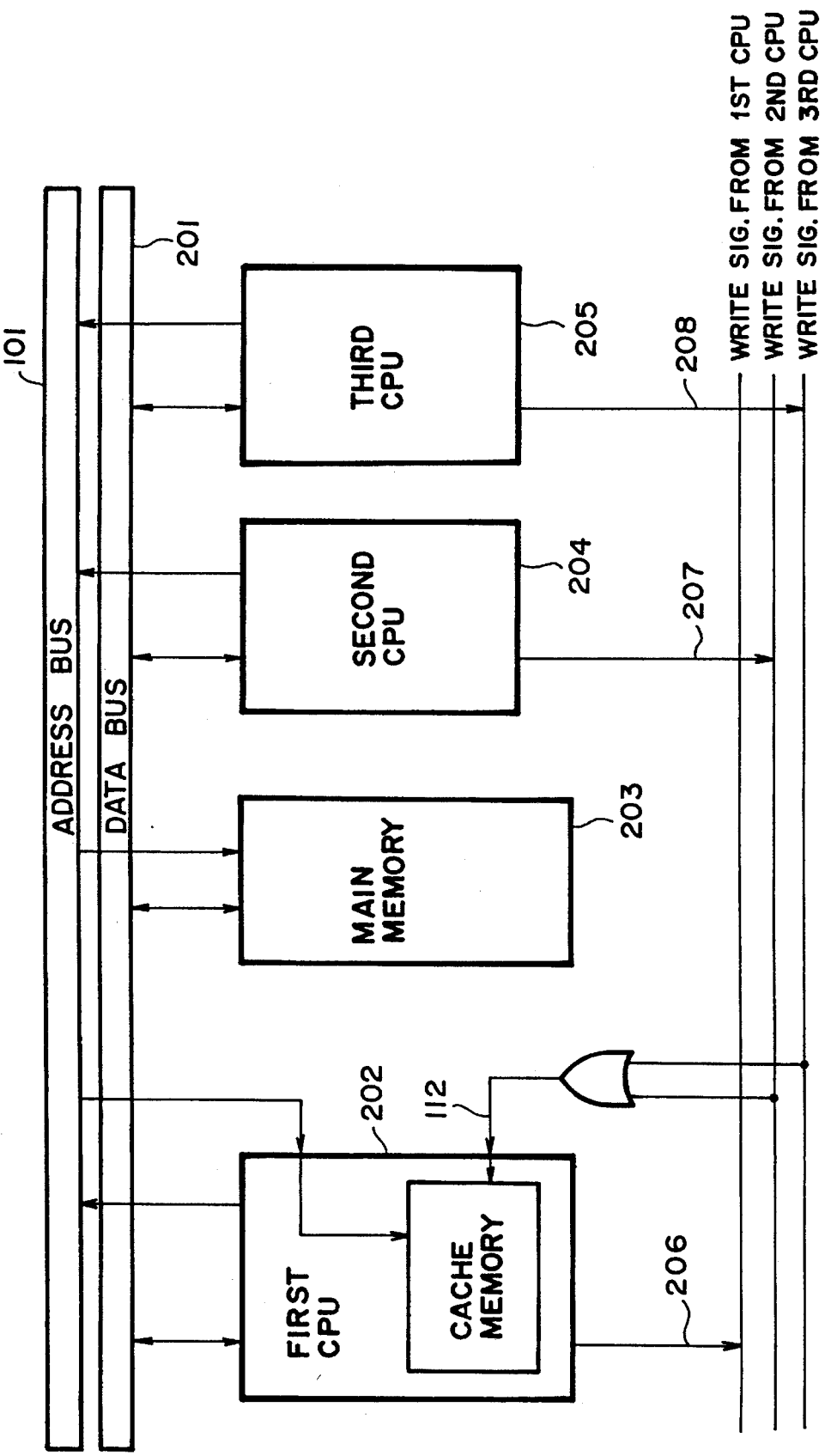
FIG. 2 is a structural block diagram illustrating a conventional system in which a cache memory unit is incorporated.

As is the case in the conventional system organization shown in FIG. 2, the strobe signal input terminal 113 receives write signals from the other processors.

Figure 4:
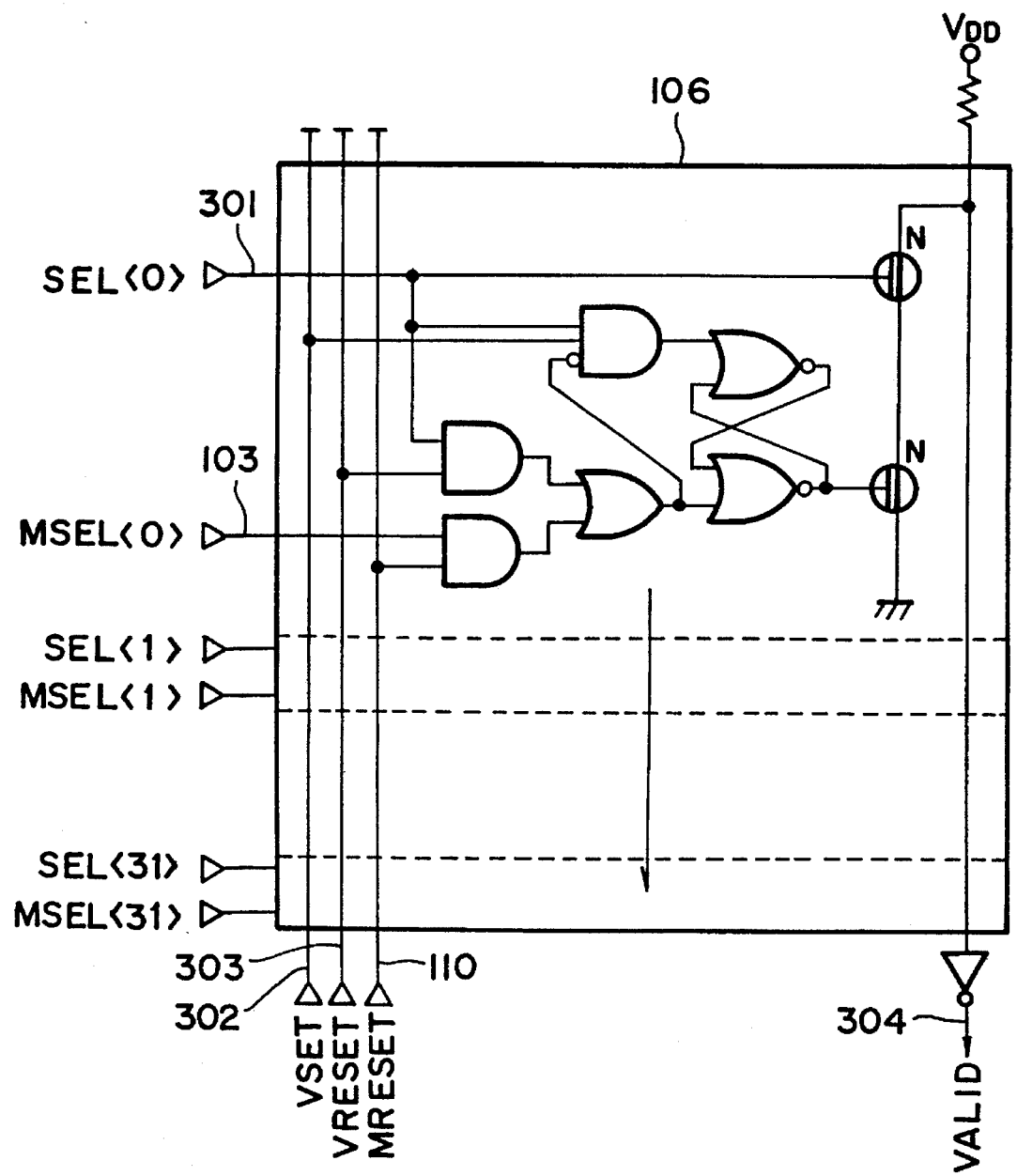
FIG. 4 is a detailed circuit diagram of the valid flag means of the cache memory to be used in the multiprocessor according to the invention.

Next, the valid flag 106 is explained with reference to FIG. 4. Normally, the valid flag 106 consists of one bit for one entry or one bit for one word. Here, the explanation is made on the premise that there is one bit for one entry. In a normal cache memory replacing operation, one entry of the cache memory is first selected by a select signal (SEL <0>) and, if this is to be registered, then a valid set signal (VSET) 302 becomes active, thereby setting a flip-flop (comprising a pair of cross-coupled NOR gates and hereinafter referred to as an "F/F"). For the system reset or the cache clear, the F/F is cleared by a valid reset signal (VRESET) 303.

At the time of a cache hit, the contents of the F/F in the selected entry are outputted by a valid signal (VALID) 304. In the monitoring, one cache entry is selected first by the monitoring select signal (MSEL <0>) 103 and the F/F is reset by the monitoring clear signal (M RESET) 110.

As explained above, in the cache memory unit for the multiprocessor according to the present invention, there is no need to provide any special dedicated control circuit, and the monitoring enable flag is reset when the operation enters into the ICE program by the interruption of the ICE and is set when the operation is freed from the ICE program. In this way, no monitoring is performed in the course of execution of the ICE program and, in the user's program, the contents of the cache memory can be dealt with in the usual manner without causing any delay in the execution time and without changing the timing for debugging the system.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A cache memory unit for use in a multiprocessor, said cache memory unit comprising:

a data memory which stores a data copied from a main memory;

a tag memory which stores address information of the data stored at said data memory;

a valid flag means which indicates whether contents of said data memory are valid and which is cleared by a monitoring clear signal;

an address bus which is connected to the main memory and which transfers the address information;

a comparing means which compares contents of said address bus and contents of said tag memory;

a clear signal producing means which produces a monitoring clear signal based on an output from said comparing means and a monitoring strobe signal indicating whether contents of the main memory are rewritten; and a monitoring strobe signal activating means which activates or inactivates said monitoring strobe signal in accordance with a monitoring enable flag.

2. A cache memory unit for use in a multiprocessor according to claim 1, in which said clear signal producing circuit is constituted by an AND gate having a first input node connected to an output node of said comparing means, a second input node connected to said monitoring strobe signal activating means and an output node connected to said valid flag means.

3. A cache memory unit for use in a multiprocessor comprising:

a data memory which stores a dam copied from a main memory;

a tag memory which stores address information of the data stored at said data memory;

a valid flag means which indicates whether contents of said data memory are valid and which is cleared by a monitoring clear signal;

an address bus which is connected to the main memory and which transfers the address information;

a comparing means which compares contents of said address bus and contents of said tag memory;

a clear signal producing means which produces said monitoring clear signal based on an output from said comparing means and a monitoring strobe signal indicating whether contents of the main memory are rewritten; and a monitoring strobe signal activating means which activates or inactivates said monitoring strobe signal, said monitoring strobe signal activating means being constituted by a monitoring enable flag means and an AND gate having a first input node receiving a monitoring enable flag issued from said monitoring enable flag means, a second input node receiving said monitoring strobe signal and an output node connected to said clear signal producing circuit.

4. A cache memory unit for use in a multiprocessor according to claim 3, in which said monitoring enable flag means is constituted by a flip-flop circuit.

* * * * *